(12) United States Patent
Fortin et al.

(10) Patent No.: US 7,305,889 B2
(45) Date of Patent: Dec. 11, 2007

(54) MICROELECTROMECHANICAL SYSTEM PRESSURE SENSOR AND METHOD FOR MAKING AND USING

(75) Inventors: Jeffrey Fortin, Niskayuna, NY (US); Kuna Kishore, Bangalore (IN); Kanakasabapathi Subramanian, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/495,318

(22) Filed: Jul. 31, 2006

(65) Prior Publication Data

US 2006/0260411 A1    Nov. 23, 2006

Related U.S. Application Data

(62) Division of application No. 10/799,053, filed on Mar. 12, 2004, now Pat. No. 7,114,397.

(51) Int. Cl.
*H04R 17/00* (2006.01)

(52) U.S. Cl. ........................................................ 73/756

(58) Field of Classification Search ................ 73/753; 361/283.1, 283.4

See application file for complete search history.

(56) References Cited

U.S. PATENT DOCUMENTS

| | | | | |
|---|---|---|---|---|
| 4,092,696 A | * | 5/1978 | Boesen et al. | 361/283.1 |
| 4,287,553 A | * | 9/1981 | Braunlich | 361/283.4 |
| 4,530,029 A | * | 7/1985 | Beristain | 361/283.4 |
| 6,460,234 B1 | | 10/2002 | Glanchandani | |
| 2005/0159158 A1 | * | 7/2005 | Pardeep et al. | 455/436 |

FOREIGN PATENT DOCUMENTS

| | | |
|---|---|---|
| DE | 4223616 | 7/1992 |
| EP | 1353161 | 10/2002 |

OTHER PUBLICATIONS

EP Search Report Oct. 18, 2005.
J.-S. Park and Y.B. Gianchandani, "A Low Cost Batch-Sealed Capacitive Pressure Sensor," IEEE No. 0-7803-5194-0 (1999).
A. V. Chavan and K. D. Wise, "A Monolithic Fully-Integrated Vacuum-Sealed CMOS Pressure Sensor," IEEE No. 0-7803-5273-4 (2000).
Wen H. Ko and Qiang Wang, "Touch Mode Capacitive Pressure Sensors For Industrial Applications," IEEE No. 0-7803-3744-1 (1997).
Hyeoncheol Kim and Kukjin Chun, "Integrated MEMS for Pressure Transponder," 1997 International Conference on Solid-State Sensors and Actuators, IEEE No. 0-7803-3829-4 (1997).
W. P. Eaton and J. H. Smith, "Micromachined Pressure Sensors: Review and Recent Developments," Smart Mater. Struct. 6, p. 530-539 (1997).

(Continued)

*Primary Examiner*—Andre J. Allen
(74) *Attorney, Agent, or Firm*—William E. Powell, III; Curtis B. Brueske

(57) ABSTRACT

According to some embodiments, an apparatus includes a substrate that defines a plane. The apparatus also includes a first conducting plate that is substantially normal to the substrate and a second conducting plate that is (i) substantially normal to the substrate and (ii) deformable in response to a pressure.

8 Claims, 23 Drawing Sheets

OTHER PUBLICATIONS

Abhijeet V. Chavan and Kensall D. Wise, "A Monolithic Fully-Integrated Vacuum-Sealed CMOS Pressure Sensor," IEEE Transactions on Electron Devices, vol. 49, No. 1 (Jan. 2002).

C. Hierold et al., "Implantable Low Power Integrated Pressure Sensor System for Minimal Invasive Telemetric Patient Monitoring," IEEE No. 0-7803-4412-X (1999).

* cited by examiner

```
┌─────────────────────────────────┐
│   PROVIDE A VOLTAGE TO ONE      │
│    OF A FIRST CONDUCTING        │
│     PLATE AND A SECOND          │
│   CONDUCTING PLATE, THE         │
│   FIRST CONDUCTING PLATE        │
│     BEING SUBSTANTIALLY         │
│   NORMAL TO A SUBSTRATE         │
│    DEFINING A PLANE AND THE     │
│   SECOND CONDUCTING PLATE       │
│    BEING (i) ELECTRICALLY       │
│   ISOLATED FROM THE FIRST       │
│    CONDUCTING PLATE, (ii)       │
│   SUBSTANTIALLY NORMAL TO       │
│    THE SUBSTRATE, AND (iii)     │
│    DEFORMABLE IN RESPONSE       │
│         TO PRESSURE       1002  │
└─────────────────────────────────┘
                 │
                 ▼
┌─────────────────────────────────┐
│   MEASURE PRESSURE BASED        │
│    AT LEAST IN PART ON          │
│   CAPACITANCE BETWEEN THE       │
│       TWO PLATES          1004  │
└─────────────────────────────────┘
```

MICROELECTROMECHANICAL SYSTEM PRESSURE SENSOR AND METHOD FOR MAKING AND USING

The present patent application is a divisional application from U.S. patent application Ser. No. 10/799,053, filed Mar. 12, 2004 now U.S. Pat. No. 7,114,397, the disclosure of which is hereby incorporated by reference in its entirety.

BACKGROUND

A pressure sensor may convert an amount of pressure into an electrical value. For example, a pressure sensor may use a sensor diaphragm or membrane positioned parallel to a plane of a wafer to convert an amount of pressure into a capacitance value. Note that the overall size of the pressure sensor may be important. For example, the amount of space on a wafer that is occupied by a pressure sensor (referred to as the sensor's "footprint") might make a device expensive to produce and/or make the sensor impractical for some applications. Thus, it may be important that a pressure sensor does not occupy too large of an area on a wafer.

In addition, increasing the sensitivity of a pressure sensor might require an increase in the sensor's footprint. Moreover, such a change could require that some parts of the sensor are completely re-designed (which can be a difficult and time-consuming process).

SUMMARY

According to some embodiments, an apparatus includes a substrate that defines a plane. The apparatus also includes a first conducting plate that is substantially normal to the substrate and a second conducting plate that is (i) substantially normal to the substrate and (ii) deformable in response to a pressure.

BRIEF DESCRIPTION OF THE DRAWINGS

FIG. 10 illustrates a method to measure pressure according to some embodiments.

DETAILED DESCRIPTION

Figure 1:
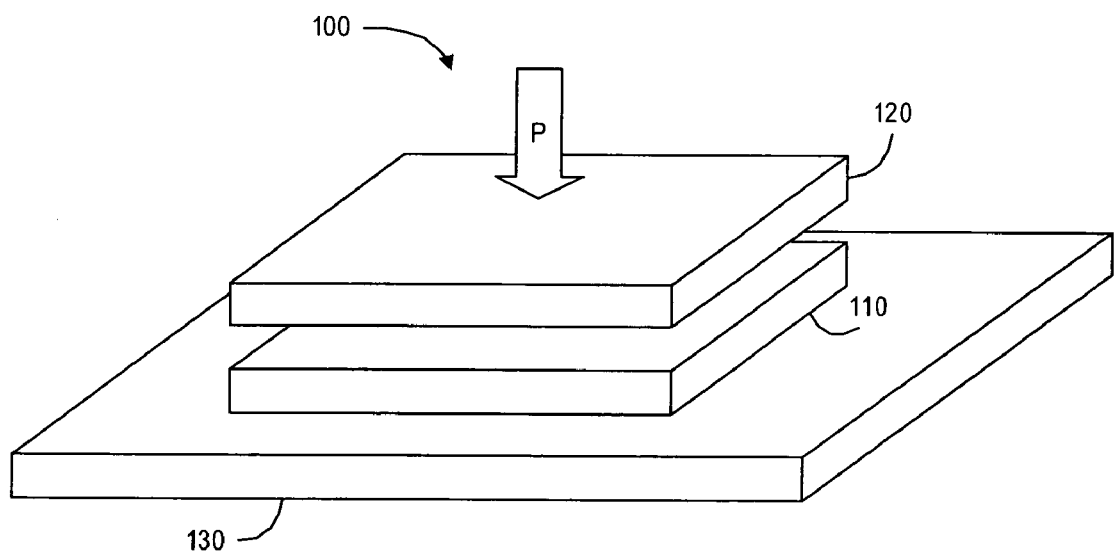
FIG. 1 is a perspective view of a known pressure sensor.
Figure 2:
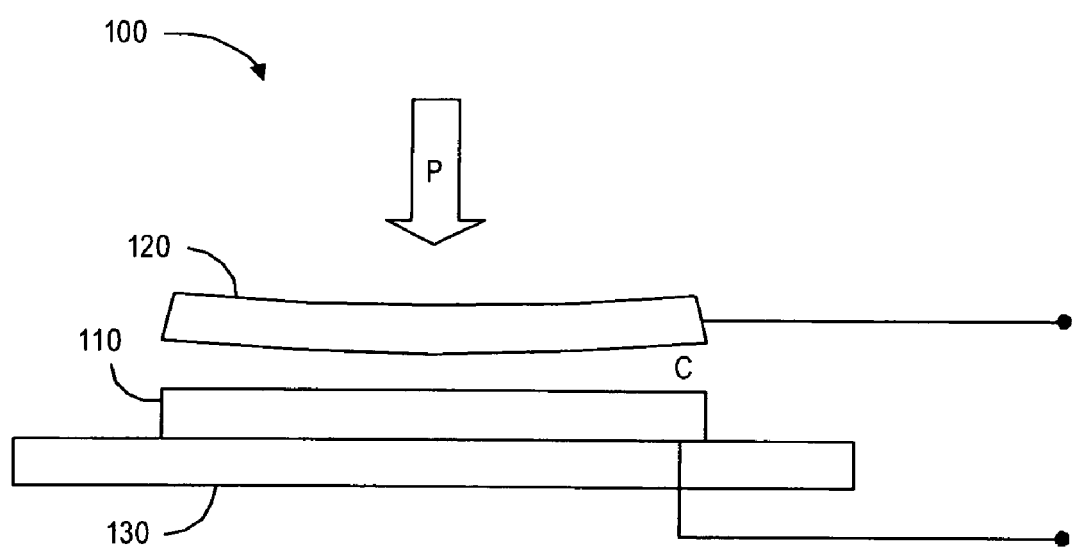
FIG. 2 is a side view of the pressure sensor of FIG. 1.

FIG. 1 illustrates a capacitive pressure sensor 100. The sensor 100 includes a pair of conducting plates 110, 120 that are positioned substantially parallel to a horizontal plane that is defined by a non-conducting substrate 130 (e.g., a wafer). Note that in some cases, the plate 110 could formed as an integral part of the substrate 130. One of these plates 120 is deformable in response to pressure (P). In particular, as shown in the side view of the sensor 100 illustrated in FIG. 2, the plate 120 might be a thin film diaphragm that flexes such that the distance between the two plates 110, 120 will decrease when a pressure P acting on the conducting plates 110, 120 is increased.

Note that the capacitance C between the plates 110, 120 depends in part on the distance between them. In particular, when the two plates 110, 120 are electrically isolated from each other, it can be detected that the amount of capacitance C increases as the plates 110, 120 move together. An increase in the pressure P, therefore, can be measured based on the increased capacitance C, since the increased pressure will push one plate 120 closer to the other plate 110. Instead of capacitance, a resistance associated with a single deformable plate or diaphragm might be used to measure pressure. For example, one or more piezoreistors could be embedded in a diaphragm. In this case, the diaphragm itself might be formed of a non-conducting material.

The plates 110, 120 used for the pressure sensor 100 sensor might be, for example, several hundred microns wide. Moreover, improving the sensitivity of the sensor 100 may require even larger plates 110, 120. The relatively large footprint associated with the sensor 100 might make the device expensive to produce and/or make the sensor 100 impractical for some applications. In addition, the large plates 110, 120 could be damaged if too much pressure is applied (e.g., the flexible plate 120 could detach from a supporting structure).

Figure 3:
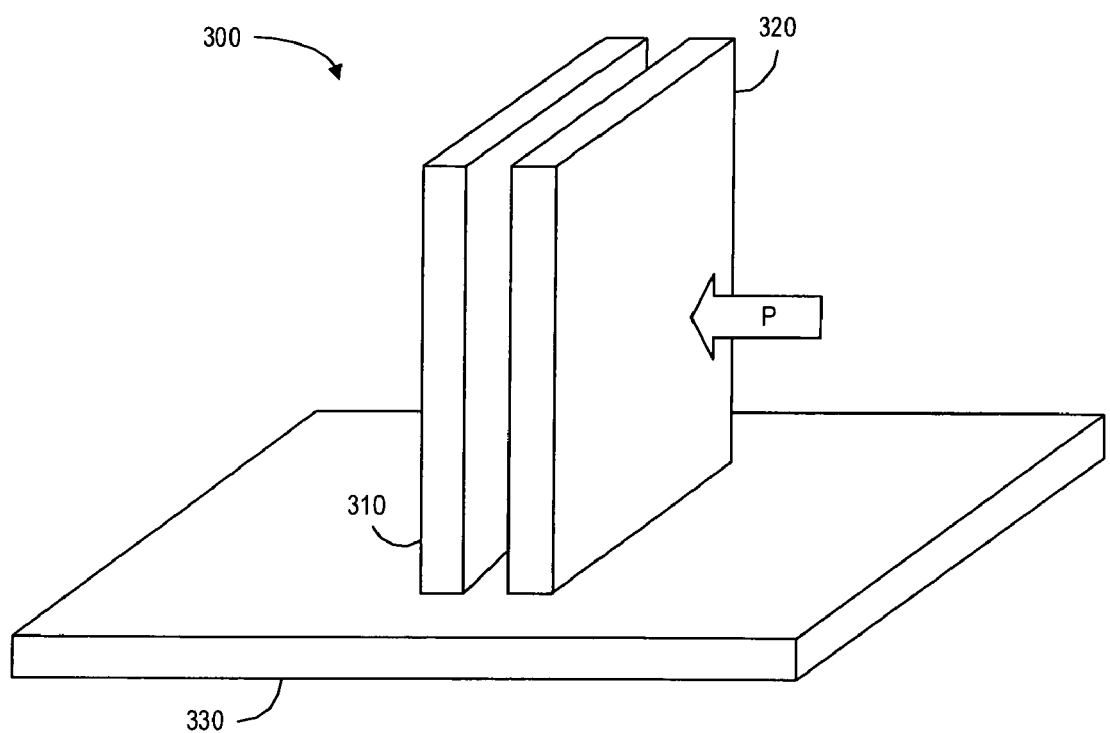
FIG. 3 is a perspective view of an apparatus constructed in accordance with an exemplary embodiment of the invention.

FIG. 3 is a diagram of an apparatus 300 according to some embodiments. The apparatus 300 may be, for example, a Microelectromechanical System (MEMS) device.

As before, a first conducting plate 310 and a second conducting plate 320 are provided on a non-conducting substrate 330. The plates 310, 320 may be formed, for example, using silicon and the substrate may formed using oxide. As illustrated, the plates 310, 320 are substantially normal to the substrate 330. That is, the plates 310, 320 extend vertically from a horizontal plane defined by the substrate 330.

Figure 4:
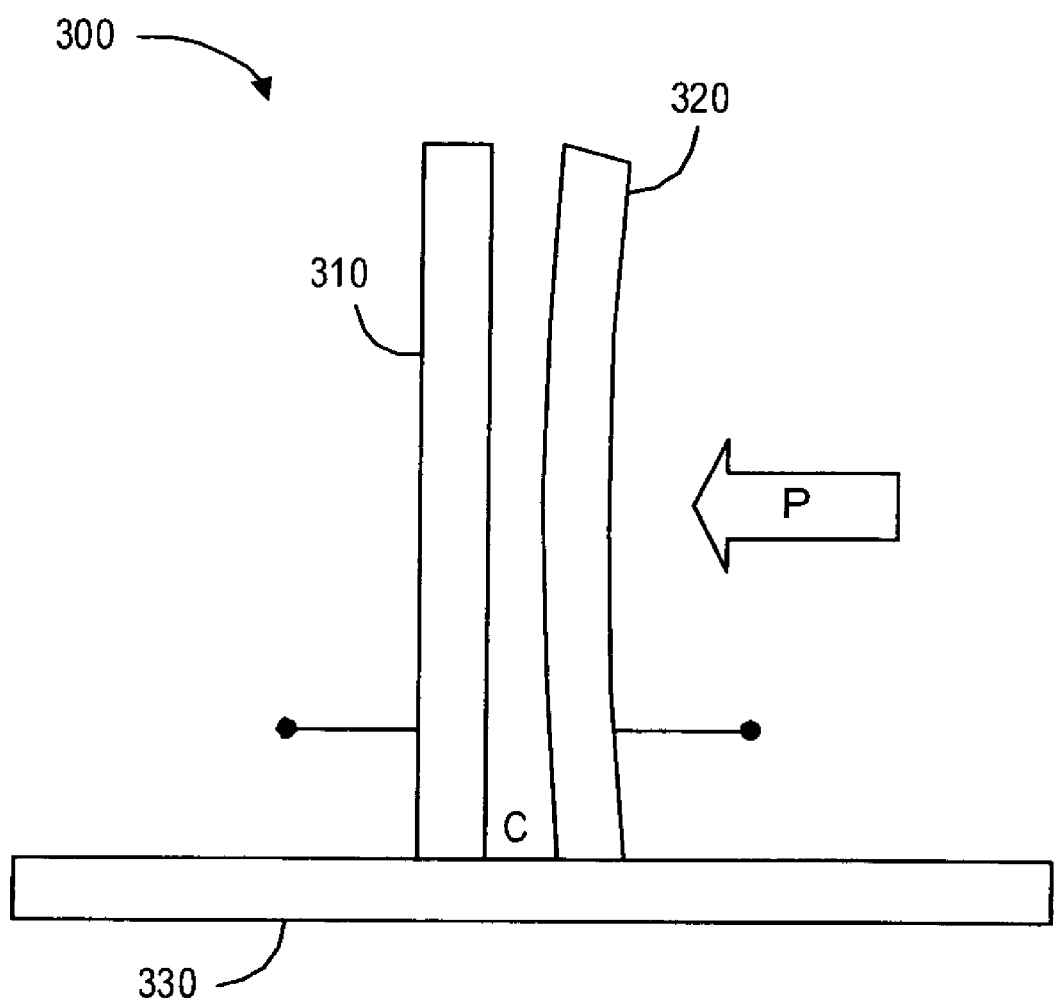
FIG. 4 is a side view of the apparatus of FIG. 3.

At least one of the plates 310, 320 is deformable in response to a pressure P. The deformable plate may, for example, flex in a direction substantially in the horizontal plane. Referring to the side view of the apparatus 300 illustrated in FIG. 4, the second plate 320 may flex such that the distance between the two plates 310, 320 will decrease when the pressure P is increased. Thus, when the two plates 310, 320 are electrically isolated from each other, it can be detected that the capacitance C increases as the pressure P increases. Because the plates 310, 320 extend vertically from the substrate 330, the footprint of the apparatus 300 might be, for example, a few microns in width.

Figure 5:
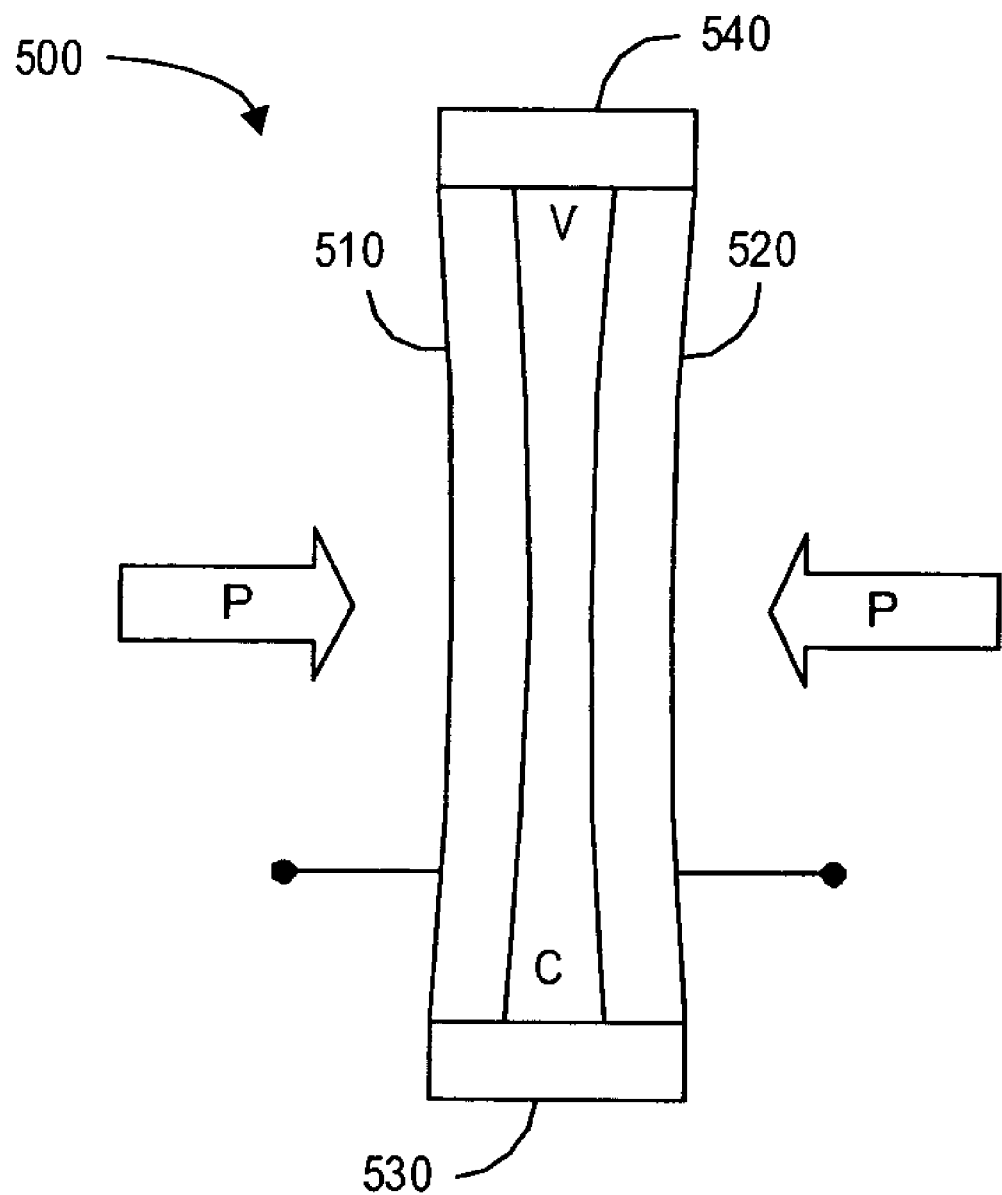
FIG. 5 is a cross-sectional view of a sealed pressure sensor constructed in accordance with an exemplary embodiment of the invention.
Figure 6:
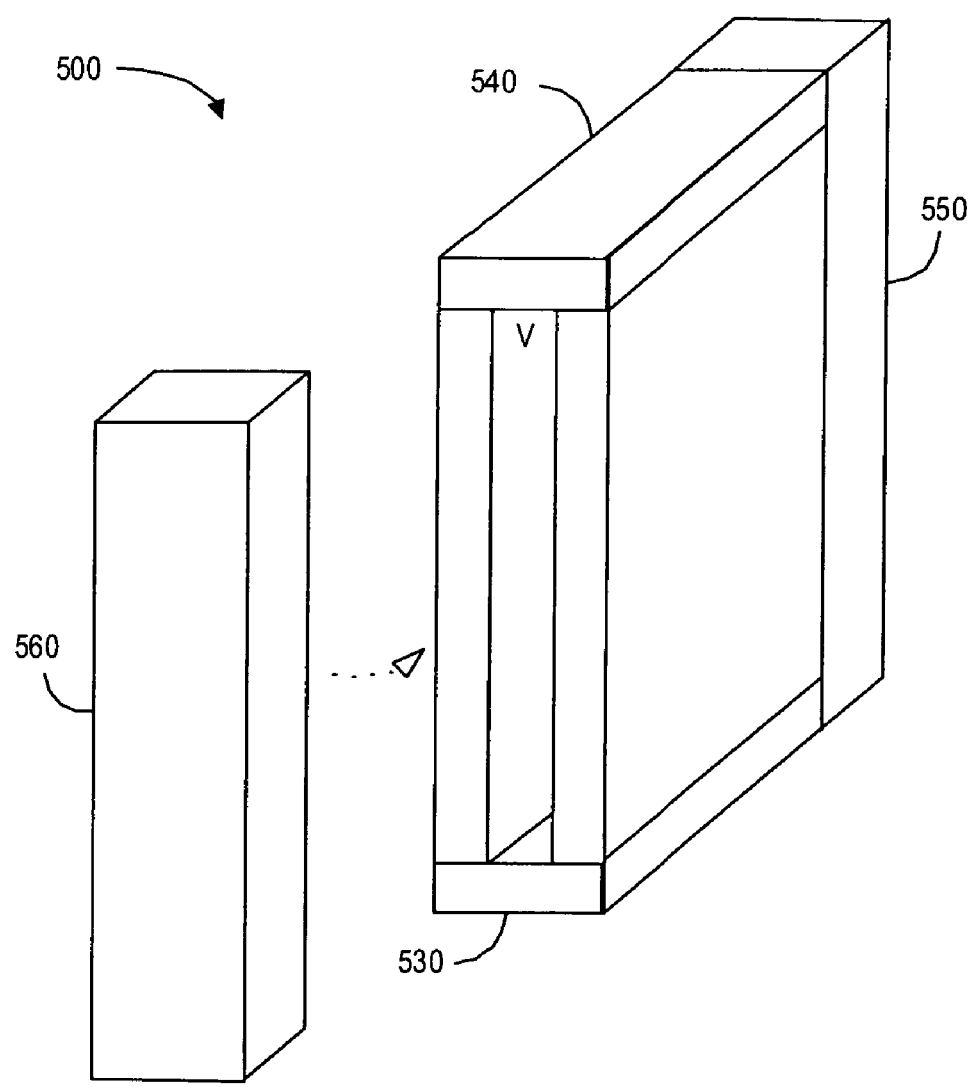
FIG. 6 is a perspective view of the sealed pressure sensor of FIG. 5.

FIG. 5 is a cross-sectional view of a sealed pressure sensor 500 according to some embodiments. A first conducting plate 510 and a second conducting plate 520 extend vertically from a horizontal plane defined by a substrate 530. Note that, as illustrated, both plates 510, 520 are deformable in response to pressure. This capability increases the change in capacitance, and therefore, improves the sensitivity of the sensor 500. A cap 540 has been provided at an end of the plates 510, 520 opposite from the substrate 530. FIG. 6 is a perspective view of the sensor 500 including the substrate 530 and cap 540. A back wall 550 and a front wall 560 (which is shown apart from the sensor 500 in FIG. 6 only for the purpose of illustration) are also provided so that a vacuum (V) can be created in the chamber between the two conducting plates 510, 250 (this may also improve the sensitivity of the sensor 500). With respect to the embodiment illustrated in FIGS. 5 and 6, the cap 540 may be formed using a non-conducting material so that the plates are electrically isolated from each other. Note a reference pressure other than a vacuum might be provided in the chamber between the two conducting plates 510, 520. In this case, the side walls of the chamber may deflect inward. That is, the center of the side walls might flex toward the vacuum while the four edges of each side wall remain fixed.

Figure 7:
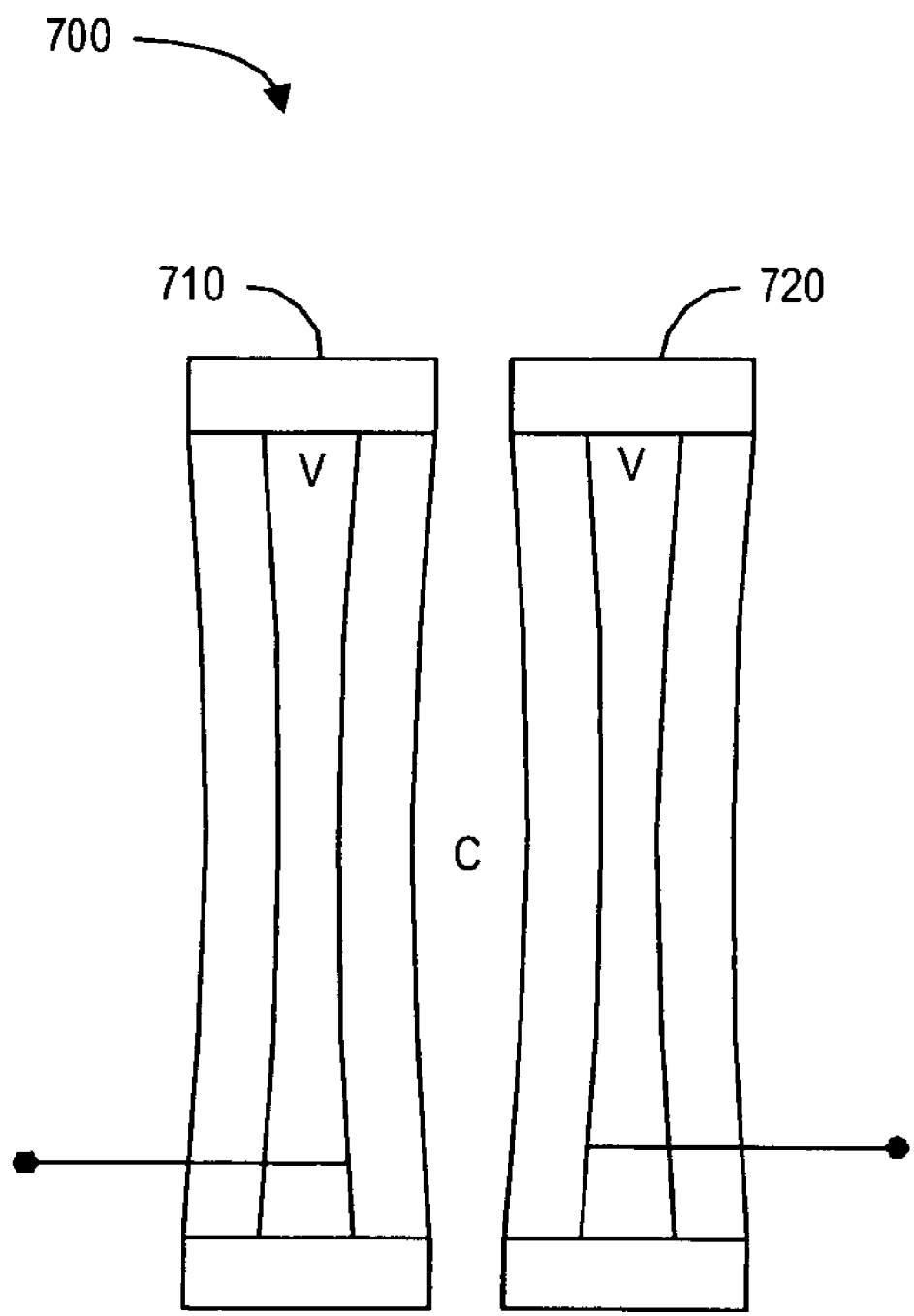
FIG. 7 is a side view of an apparatus constructed in accordance with another exemplary embodiment of the invention.

FIG. 7 is a side view of an apparatus 700 according to other embodiments. In this case, two pairs of conducting plates are provided, each pair enclosing a vacuum V therebetween. As used herein, the term "finger" will refer to such a pair of conducting plates (with or without a vacuum). Note that, in this embodiment, two plates within a finger may be electrically coupled to each other.

According to this embodiment, the first finger 710 is electrically isolated from the second finger 720. When the ambient pressure increases, the plates on the fingers 710, 720 deform inward. Thus, the capacitance C between one plate of the first finger and another plate of the second finger decreases. An imbalance between the ambient pressure and the pressure between the plates of each finger causes the plates of each finger to bow inwardly and thus away from the nearest plate of the adjacent finger, thereby causing the decrease in the capacitance C.

In this way, the capacitance C can be used to sense pressure (e.g., with an increase in C representing a decrease in P). Note that, in this embodiment, air acts as the dielectric of the capacitor (unlike FIG. 2, where the vacuum acted as the dielectric). As a result, a change in temperature and/or humidity may also result in a change in the capacitance C. Therefore, in some applications a separate temperature and/or humidity sensor may be provided to account for this effect. Also note that any technique might be used to measure an amount of and/or a change in the capacitance C. For example, a change in capacitance might be converted into a voltage that can be measured and/or approaches using Alternating Current (AC) could be implemented.

Figure 8:
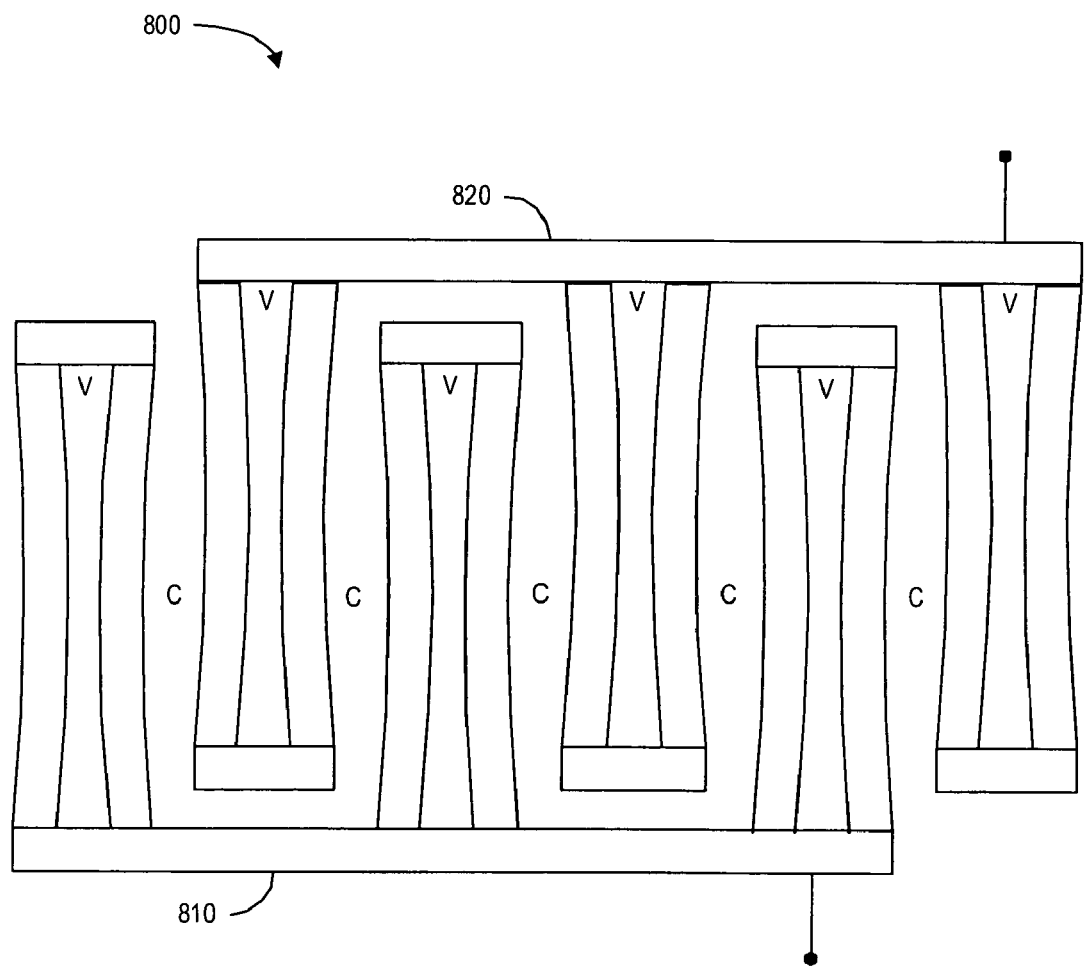
FIG. 8 is a top view of a pressure sensor with a vertical capacitor array constructed in accordance with another exemplary embodiment of the invention.

FIG. 8 is a top view of a pressure sensor 800 with a vertical capacitor array according to some embodiments. In particular, the sensor 800 includes a first comb 810 with a conducting base and three fingers that extend away from the base (as well as vertically from a substrate not illustrated in FIG. 8). The sensor 800 also has a second comb 820 with a conducting base and three fingers. The combs 810, 820 are positioned such that the fingers of one are interleaved with the fingers of the other. Note that although each comb 810, 820 illustrated in FIG. 8 has three fingers, any number of fingers may be provided.

The first comb 810 is electrically isolated from the second comb 820. Note that when the ambient pressure increases, the plates on all of the fingers will deform inwardly. Thus, the capacitance C between the fingers will decrease (e.g., because neighboring plates are pushed further apart). Also note that the five capacitance values C associated with this embodiment are connected in parallel. Therefore, the values will add to each other, improving the pressure sensitivity of the sensor 800.

Figure 9:
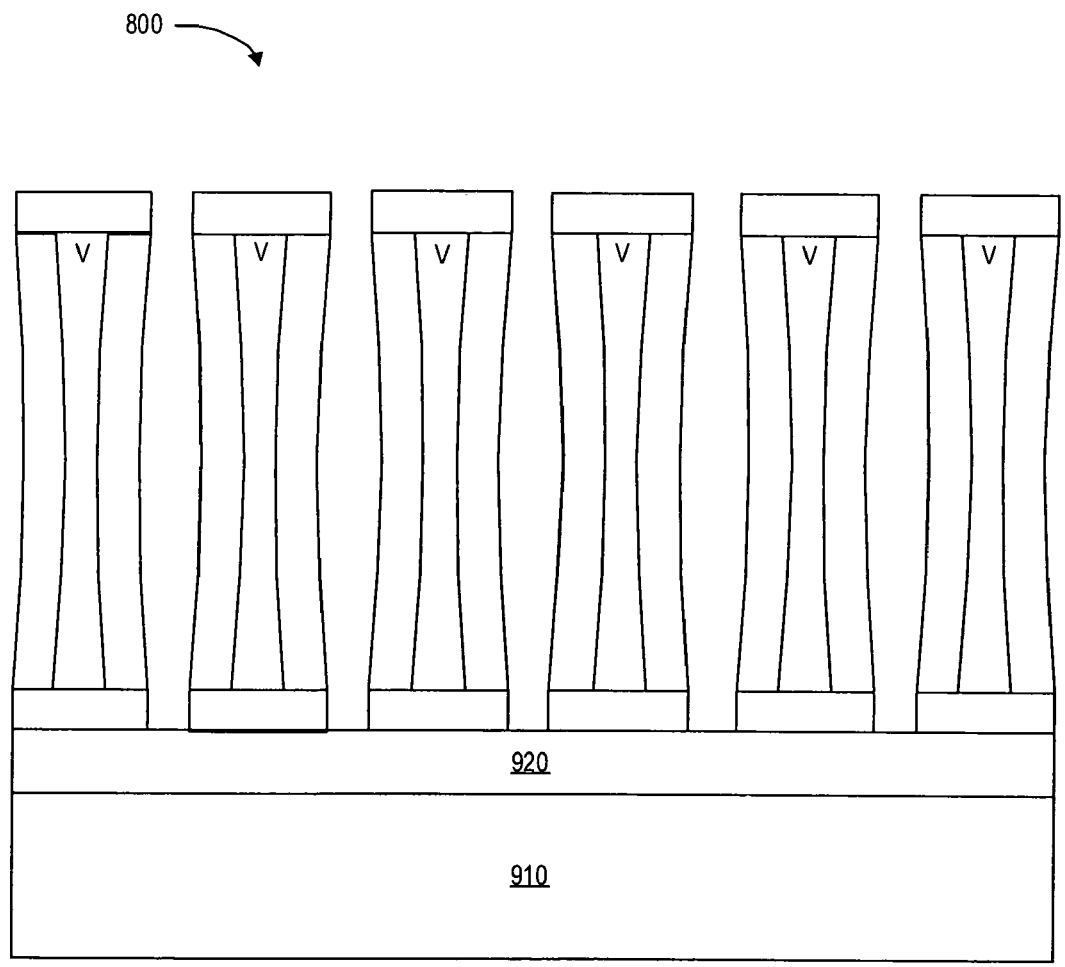
FIG. 9 is a side view of the pressure sensor of FIG. 8.

FIG. 9 is a side view of the pressure sensor 800 according to this embodiment. Note that the combs may be provided on a non-conducting layer 920 (e.g., such that the two combs are electrically isolated from each other). Moreover, the non-conducting layer 920 may be bonded to another layer 910 to provide structural support. According to some embodiments, this supporting layer 910 is a glass wafer (e.g., to reduce parasitic capacitance effects). The support layer 910 could also be a lightly doped or intrinsic silicon wafer. Note that the characteristics of the pressure sensor 800 may depend in part on the geometry of the elements, such as the thickness height, and length of the plates as well as the gap between neighboring plates. By way of example only, the thickness of a conducting plate might be from 2 to 15 micrometers (μm), the height of a conducting plate might be from 100 to 500 μm, the gap between conducting plates might be from 2 to 20 μm, and the length of a conducting plate might be 1000 μm. The appropriate dimensions for a particular sensor might depend on, for example, the applications for which that sensor will be used.

Thus, some embodiments provide a sensor that is sensitive to changes in pressure while occupying a relatively small area since the sensor is disposed in a vertical relationship to the wafer surface. Such an approach may provide a MEMS sensor that is scalable and inexpensive to produce (e.g., because new fingers may be added without any change in the fabrication process and with only a small increase in the sensor's footprint). Moreover, new pressure sensors may be easy to design by adding fingers as appropriate, and be less likely to be damaged.

FIG. 10 is a flow chart of a method to measure pressure according to some embodiments. a voltage is provided to one of a first conducting plate and a second conducting plate, the first conducting plate being substantially normal to a substrate defining a plane and the second conducting plate being (i) electrically isolated from the first conducting plate, (ii) substantially normal to the substrate, and (iii) deformable in response to pressure. The first conducting plate may be, for example, associated with a finger of a first comb while the second conducting plate is associated with a finger of a second comb that is electrically isolated from the first comb.

At Step 1004, pressure is measured based at least in part on an amount of capacitance that is detected between the two plates. For example, a decrease in capacitance may indicate an increase in the absolute atmospheric pressure.

Figure 11:
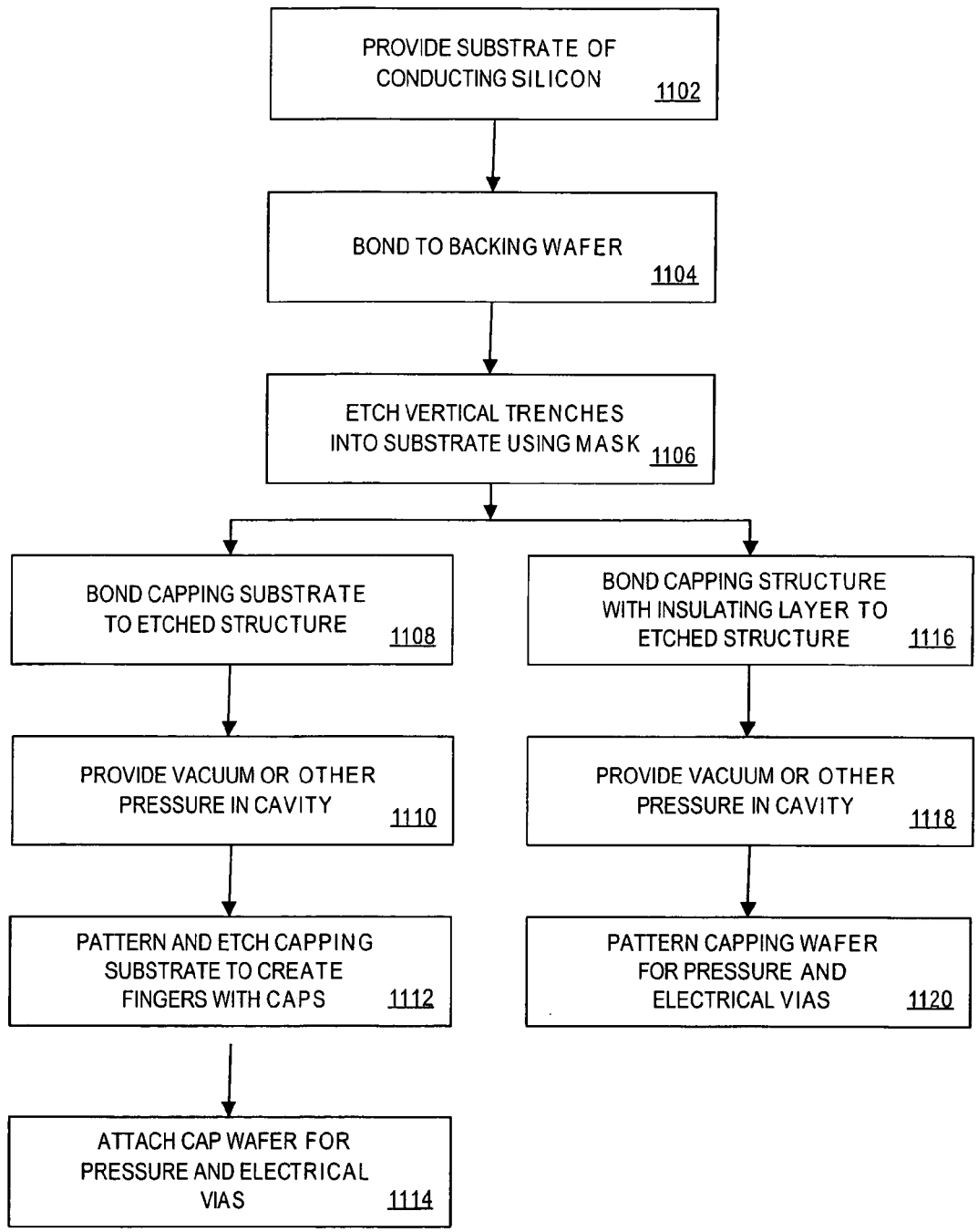
FIG. 11 illustrates a method to create a pressure sensor according to some embodiments.

FIG. 11 is flow chart of a method to create a pressure sensor according to some embodiments. Note that the actions described with respect to FIG. 11 may be performed in any order that is practical. At Step 1102, a substrate of conducting silicon is provided. In some cases, a backing wafer is bonded to the substrate at Step 1104 to provide additional support.

At Step 1106, vertical trenches are etched into the substrate using an appropriate etch mask. The etch mask may, for example, comprise a layer in which a pattern of oxide defines areas that will not be etched.

According to some embodiments, a capping substrate is bonded to the etched structure at Step 1108. Note that in this embodiment, the etched substrate and the capping substrate might not need to be electrically isolated from each other. At Step 1110, a vacuum or other pressure level is created in a cavity formed by the etched structure and capping substrate. At Step 1112, the capping substrate is etched as appropriate to create isolated figures with caps. If desired, a cap wafer may then be attached at Step 1114 to provide pressure and electrical feed-throughs or vias.

According to another embodiment, after the vertical trenches are etched in the substrate at Step 1106, a capping structure or wafer with an insulating layer is bonded to the etched structure at Step 1116. That is, the capping wafer may be electrically isolated from the etched structure. At Step 1118, a vacuum or other pressure level is created in a cavity formed by the etched structure and the capping wafer. At Step 1120, the capping wafer is patterned as appropriate to provide pressure and electrical feed-throughs or vias.

Figure 12:
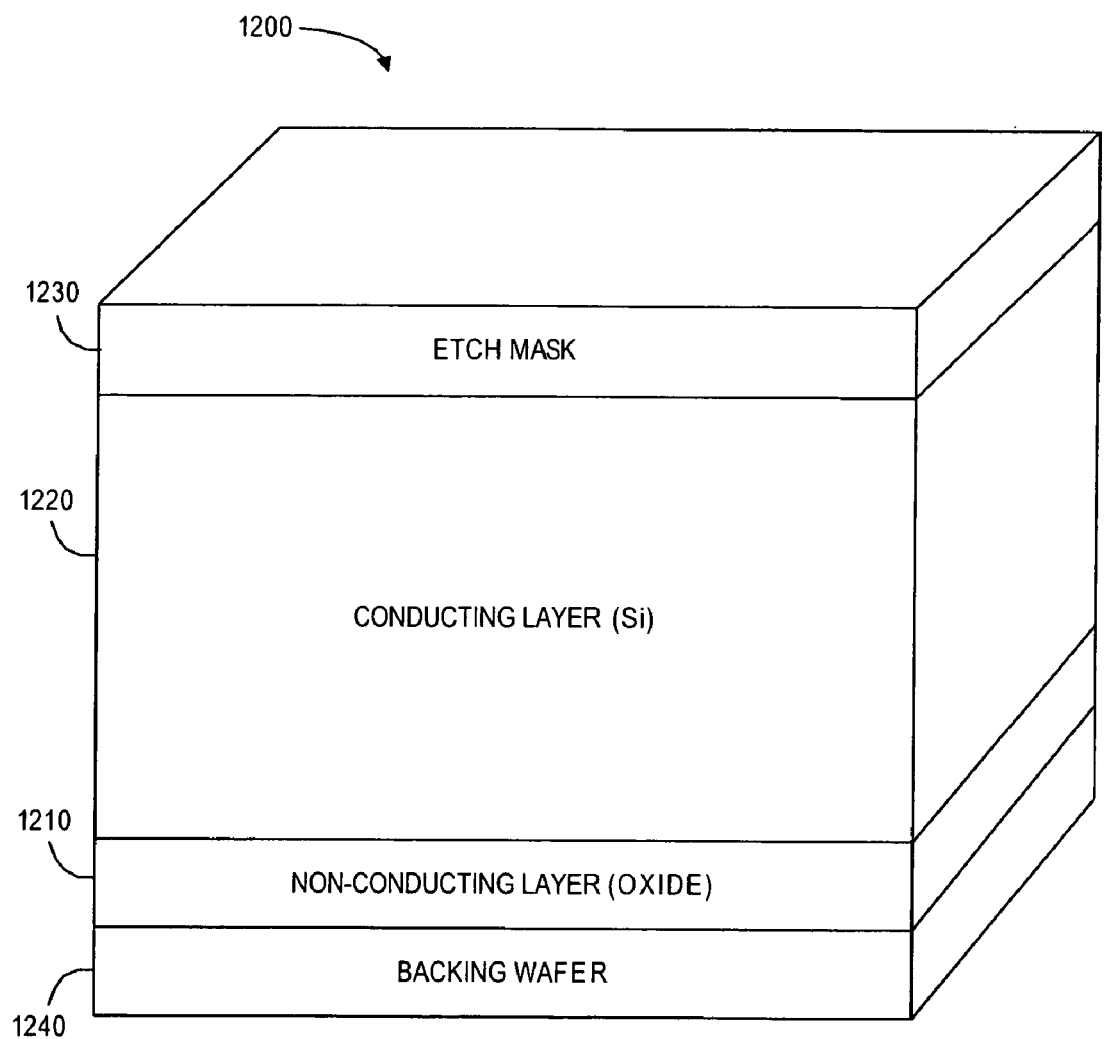
FIG. 12 is a perspective view of a wafer constructed in accordance with another exemplary embodiment of the invention.

By way of example, consider the wafer 1200 illustrated in FIG. 12. The wafer 1200 may include a base layer 1210 of non-conducting material, such as an oxide layer. In some embodiments, the base layer 1210 is bonded onto a backing wafer 1240, such as a layer of glass (or lightly doped silicon), that provides structural support for the wafer 1200.

A conducting layer 1220 is provided on the base layer 1210. The conducting layer 1220 may be, for example, a layer of highly-doped, single-crystal silicon. An etch mask layer 1230 (e.g., oxide) is then deposited on layer 1220 and patterned . . . Note that the materials used to form these (and other) layers described herein might be selected based at least in part on thermal coefficients of expansion (e.g., to ensure that a device will operate correctly over a range of temperatures). Materials might also be selected in accordance with conductivity characteristics (e.g., to insure that device electrodes remain electrically isolated from each other).

Figure 13:
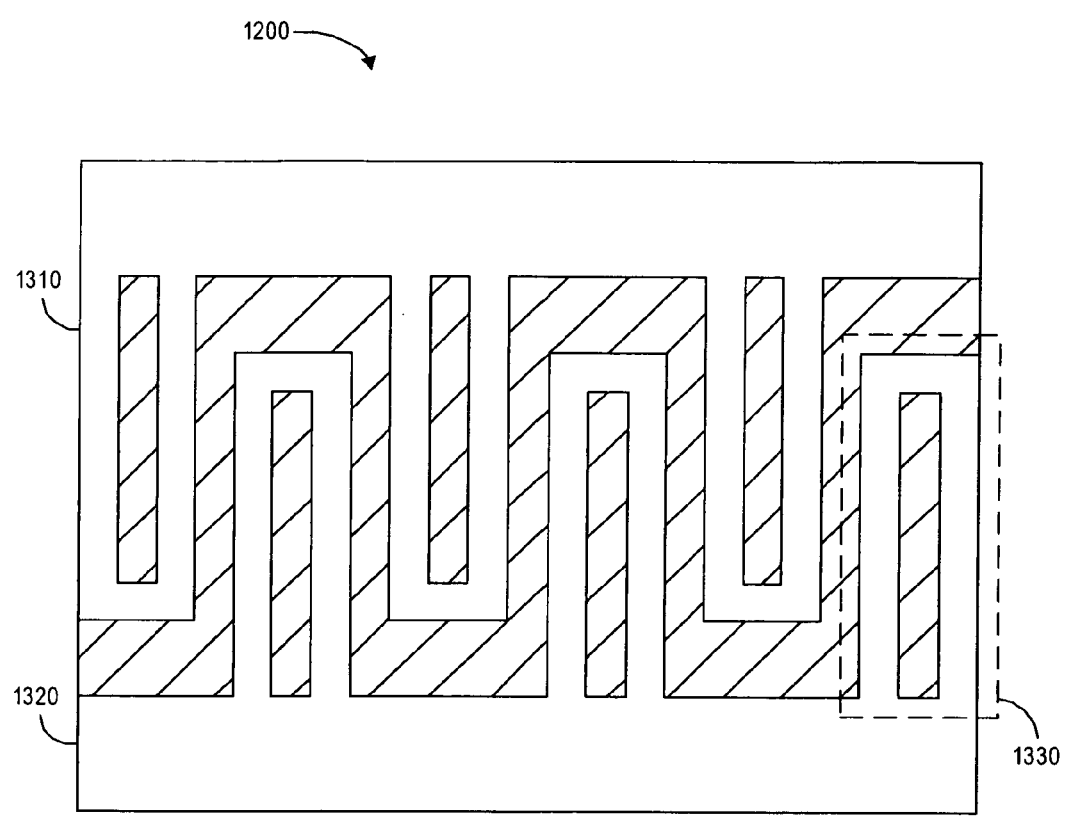
FIG. 13 is a top view of the wafer of FIG. 12 after trenches have been etched.
Figure 14:
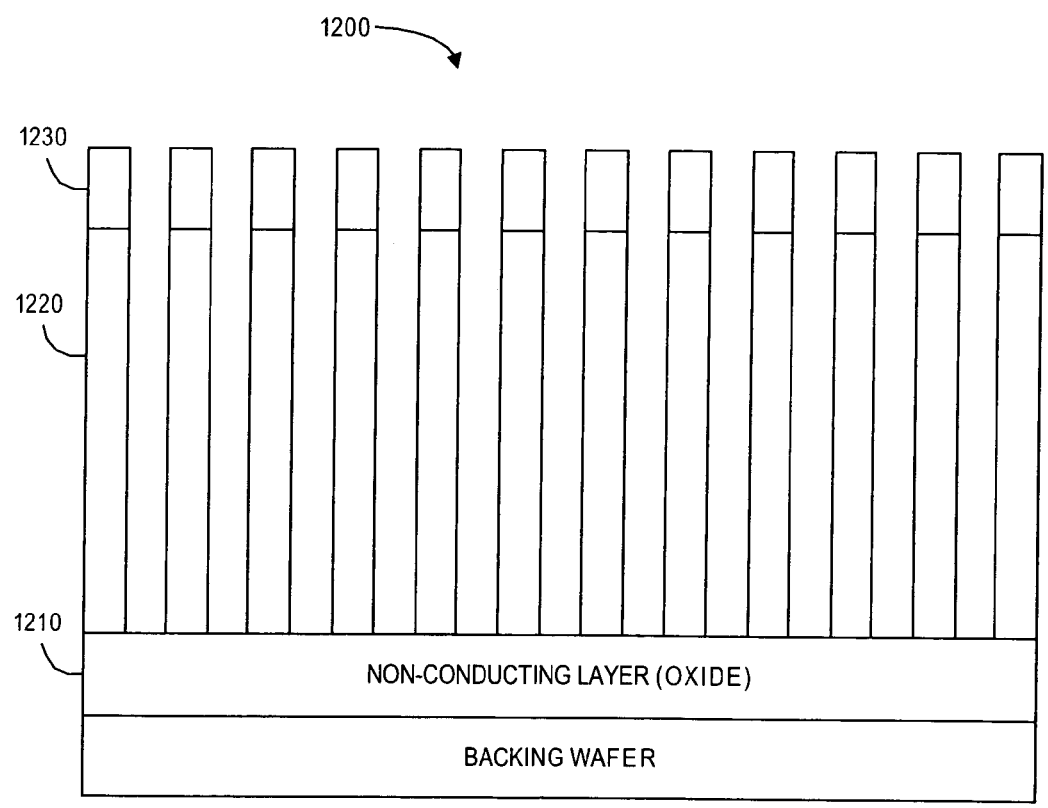
FIG. 14 is side view of the wafer of FIG. 13.

The etch mask layer 1230 may then be used to etch substantially parallel trenches through the conducting layer 1220. FIG. 13 is a top view of the wafer 1200 after the trenches have been etched (with the cross-hatched areas representing the trenches) according to some embodiments. The trenches define a series of substantially parallel, conducting plates. Moreover, the plates are substantially vertical to a horizontal plane defined by the wafer 1200, and at least one of the plates is deformable in response to pressure. Note that pairs of plates, or fingers 1330, are formed for both a first comb 1310 and a second comb 1320. According to some embodiments, at least one pressure input cavity is also formed while the trenches are etched. FIG. 14 is side view of the wafer 1200 after trenches have been etched according to some embodiments.

Figure 15:
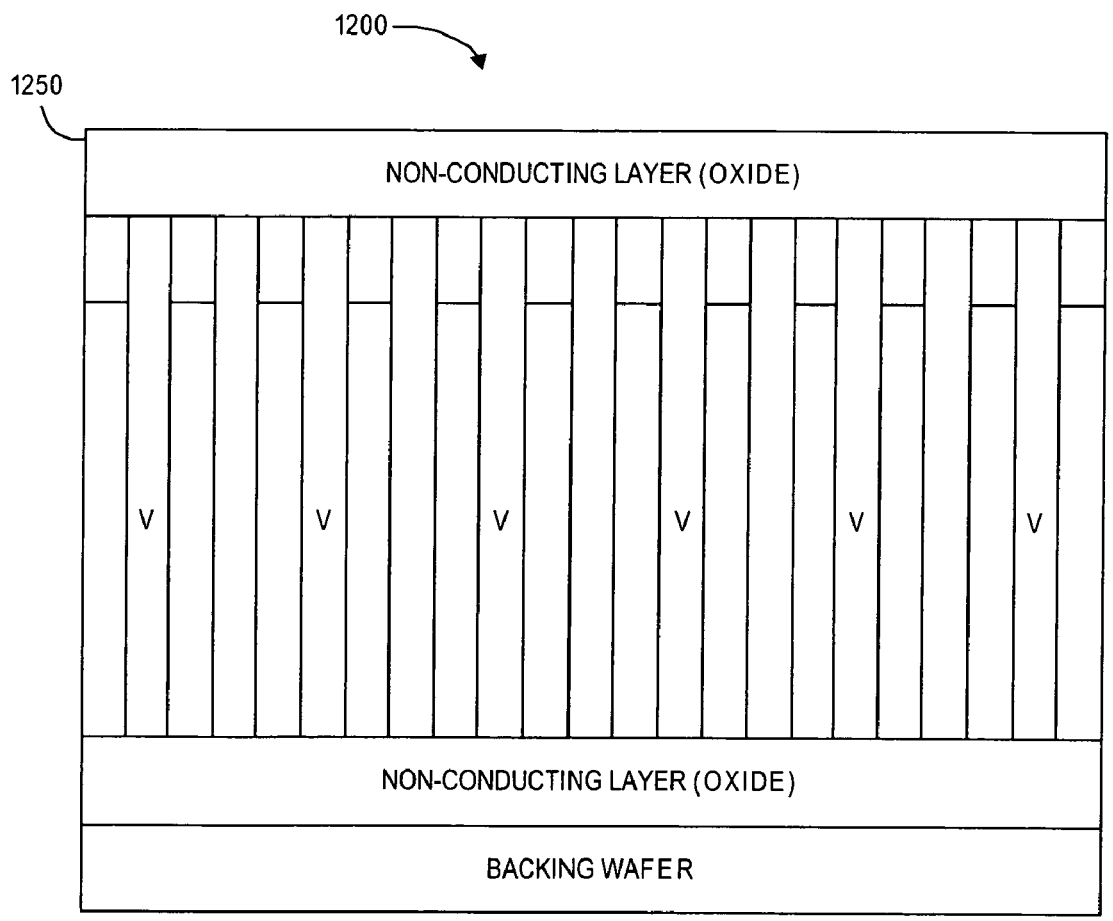
FIG. 15 is side view of the wafer of FIG. 14 after another non-conducting layer has been added.

An additional non-conducting layer may then be bonded onto the wafer. FIG. 15 is side view of the wafer 1200 after the non-conducting layer 1250 has been added according to some embodiments. This non-conducting layer 1250 may be an oxide capping structure. Note that vacuums V may now be provided between pairs of vertical plates. For example, some or all of the steps described herein might be performed within a vacuum to create the vacuums V.

Figure 16:
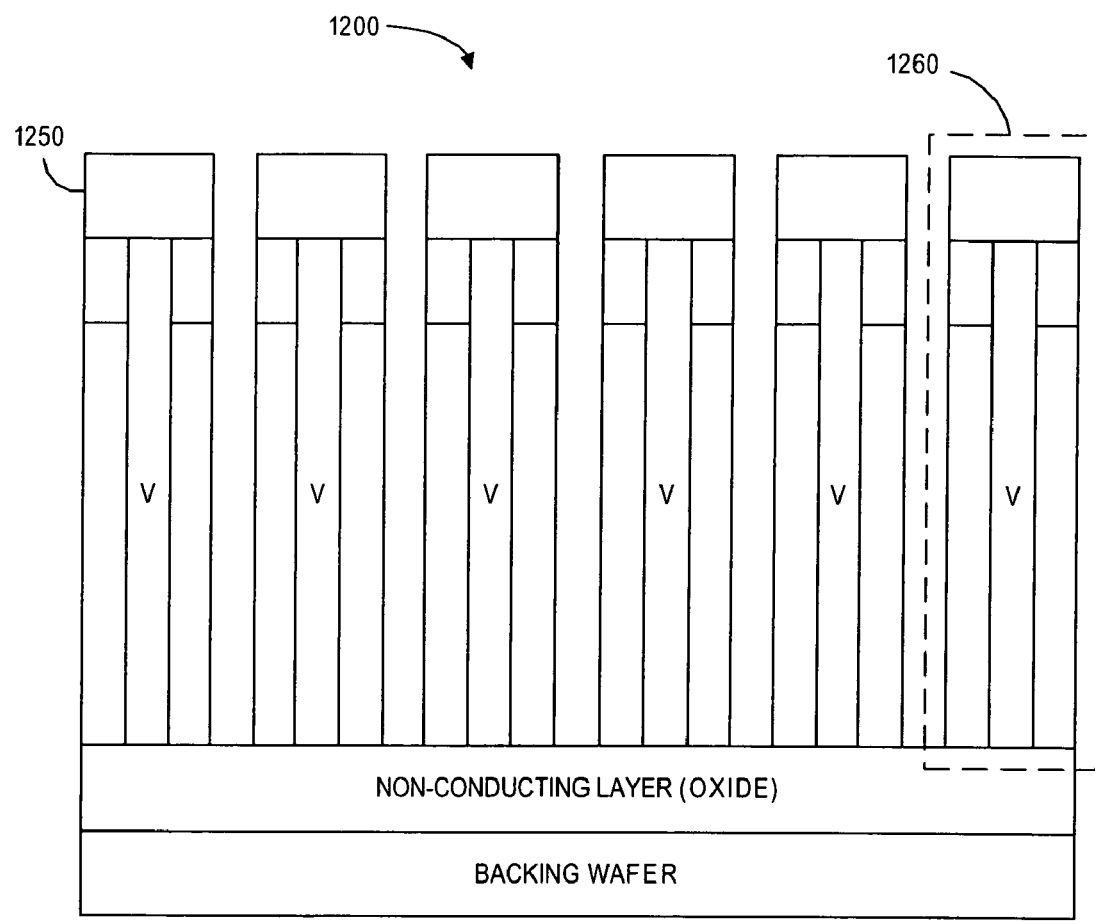
FIG. 16 is a side view of a wafer of FIG. 15 after a portion of the top non-conducting layer has been removed.

A portion of the additional non-conducting layer 1250 may then be etched away. One potential etching material may include potassium hydroxide. For example, FIG. 16 is a side view of the wafer 1200 after a portion of the top non-conducting layer has been removed according to some embodiments. In particular, the non-conducting layer 1250 now includes caps over pairs of plates that were formed in the conducting layer 1220, resulting a number of sealed fingers 1260.

According to some embodiments, a cap wafer is bonded onto the additional non-conducting layer 1250. The cap wafer may include, for example, a ground via (e.g., a hole through which a ground wire may be routed to allow some fingers to be held at a ground voltage level), a voltage via (e.g., to allow some fingers to be at voltage level other than ground), and/or pressure vias.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
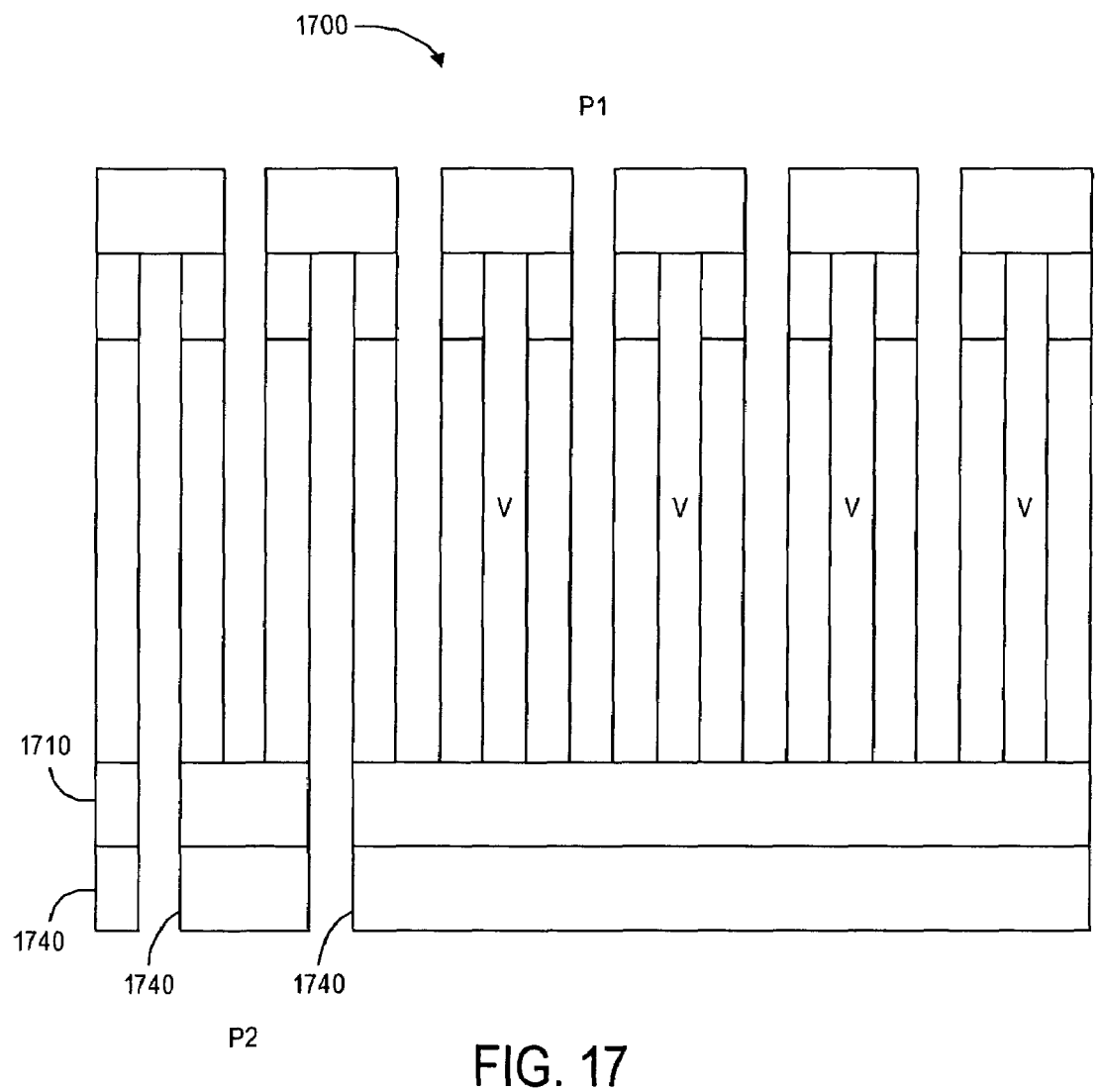
FIG. 17 is a differential pressure sensor constructed in accordance with another exemplary embodiment of the invention.

Some embodiments have been described herein with respect to an absolute pressure sensor, but embodiments may be used in connection with a gauge or differential pressure sensor. For example, FIG. 17 is a differential pressure sensor 1700 according to some embodiments. As before, some fingers are deformable in response to a first pressure P1. In this case, however, channels are provided so that some or all of the fingers are deformable in response to a second pressure P2. As a result, a change in capacitance may be associated with a difference between the first and second pressures. Note that the vias through the substrate for electrical and pressure connection may be located in either the backing substrate 1740 or a capping substrate.

Figure 18:
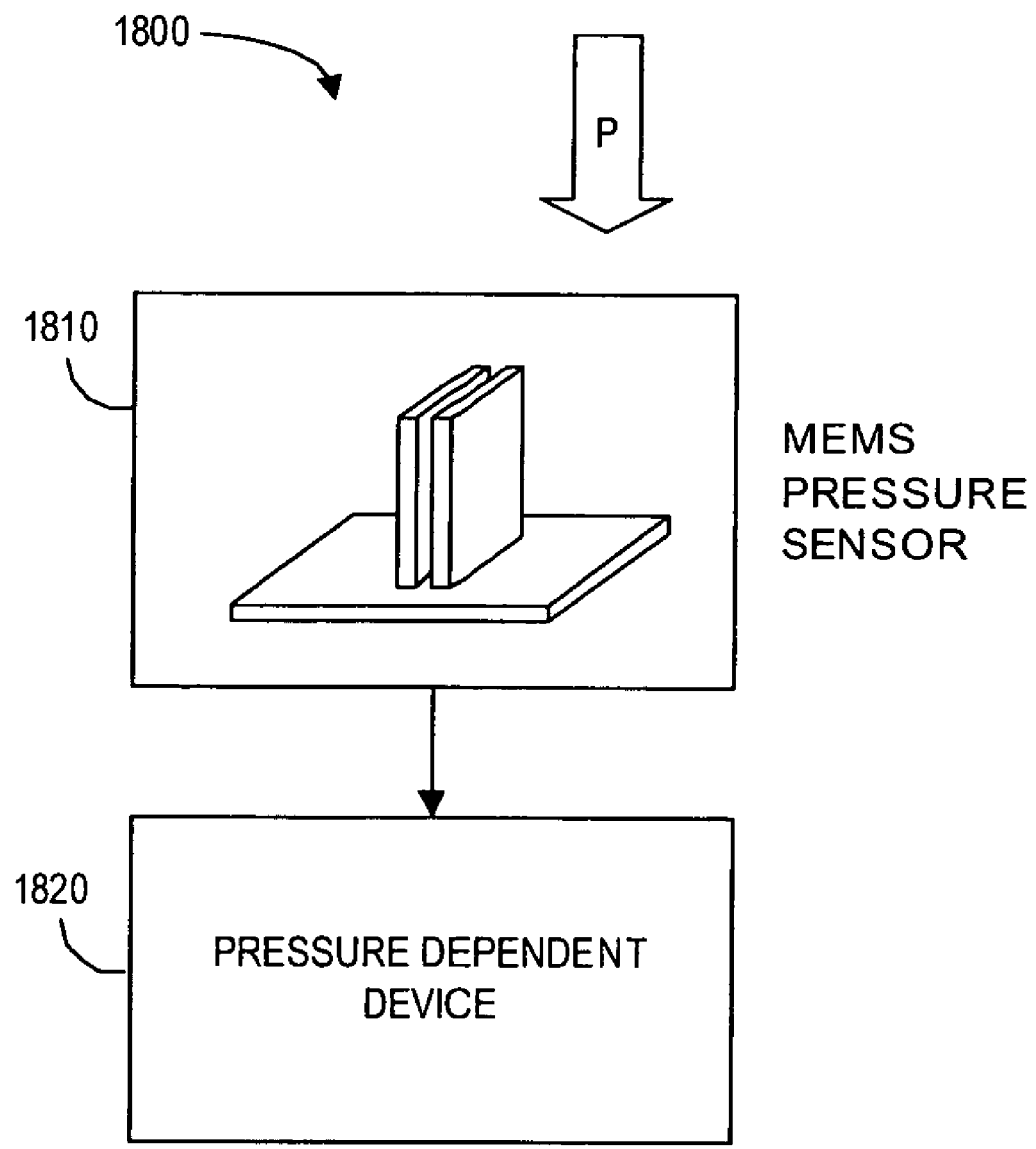
FIG. 18 is a system constructed in accordance with another exemplary embodiment of the invention.

While embodiments have been described with respect to pressure sensors, note that any of the embodiments may be associated with a system that uses a pressure sensor. For example, FIG. 18 is a system 1800 according to some embodiments. The system 1800 includes a MEMS pressure sensor 1810 that operates in accordance with any of the embodiments described herein. For example, the MEMS pressure sensor 1810 might include a substrate that defines a horizontal plane, a first conducting plate substantially vertical to the substrate, and a second conducting plate substantially vertical to the substrate and deformable in response to a pressure (P).

Information from the MEMS pressure sensor 1810 is provided to a pressure dependent device 1820 (e.g., via an electrical signal). The pressure dependent device 1820 might be, for example, associated with a pressure display, an engine or automotive device (e.g., a tire pressure monitor), an ultrasonic transducer, a medical device (e.g., a blood pressure sensor), and/or a barometer.

Figure 19:
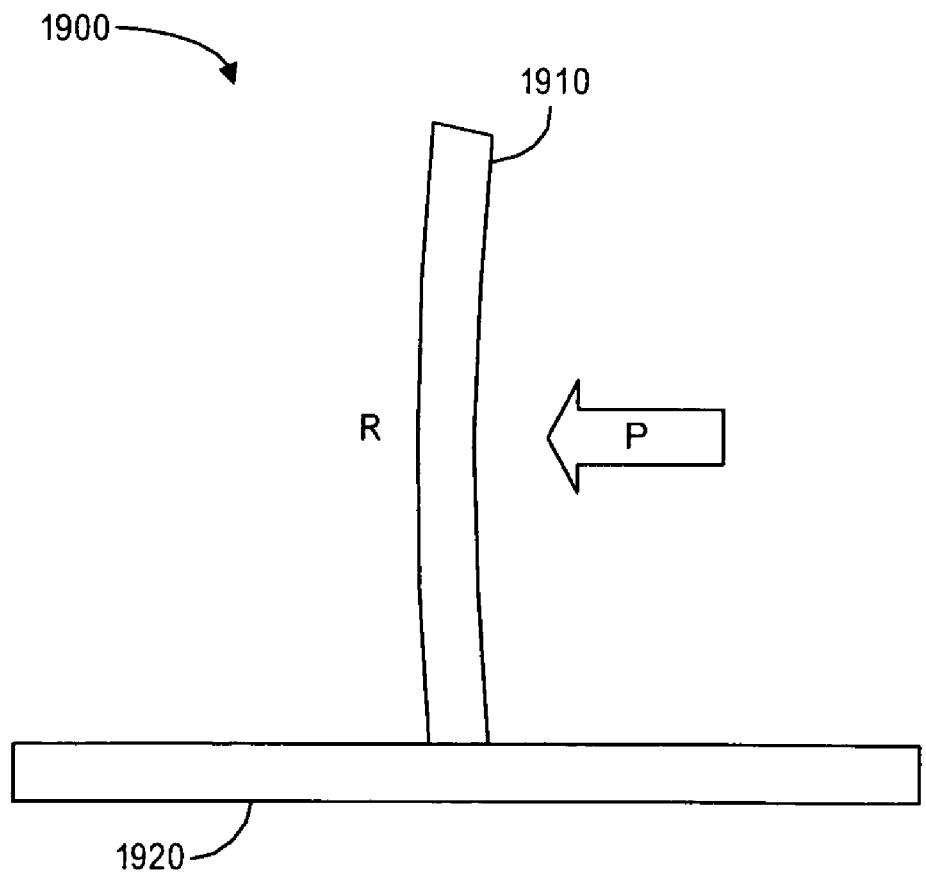
FIG. 19 is a piezoresistance pressure sensor constructed in accordance with another exemplary embodiment of the invention.

In addition, although some embodiments have been described with respect to the use of a capacitance value to sense an amount of pressure, embodiments might be associated with other types of displacement sensing techniques. FIG. 19 is a pressure sensor 1900 constructed in accordance with another exemplary embodiment of the invention. In this case, a plate 1910 or diaphragm is provided on a substrate 1920. As illustrated, the plate 1910 extend vertically from a horizontal plane defined by the substrate 1920. Moreover, the plate 1910 is deformable in response to a pressure P. The deformable plate 1910 may, for example, flex in a direction substantially in the horizontal plane. According to this embodiment, an amount of resistance R associated with the plate 1910 varies depending on an amount of stress (e.g., a portion of the plate 1910 may have piezoelectric and/or piezoresistance characteristics or devices having such characteristics may be embedded into or onto the plate 1910). As a result, the resistance R may be measured and used to determine a corresponding amount of pressure P. Because the plate 1910 extends vertically from the substrate 1920, the footprint of the sensor 1900 may be reduced as compared to traditional devices (e.g., having a diaphragm positioned horizontal to the substrate 1920). Note that according to this embodiment, the substrate 1920 may or may not be conductive. Also note that the sensor 1900 may be constructed using any of the techniques described herein (e.g., by etching trenches into a substrate).

Figure 20:
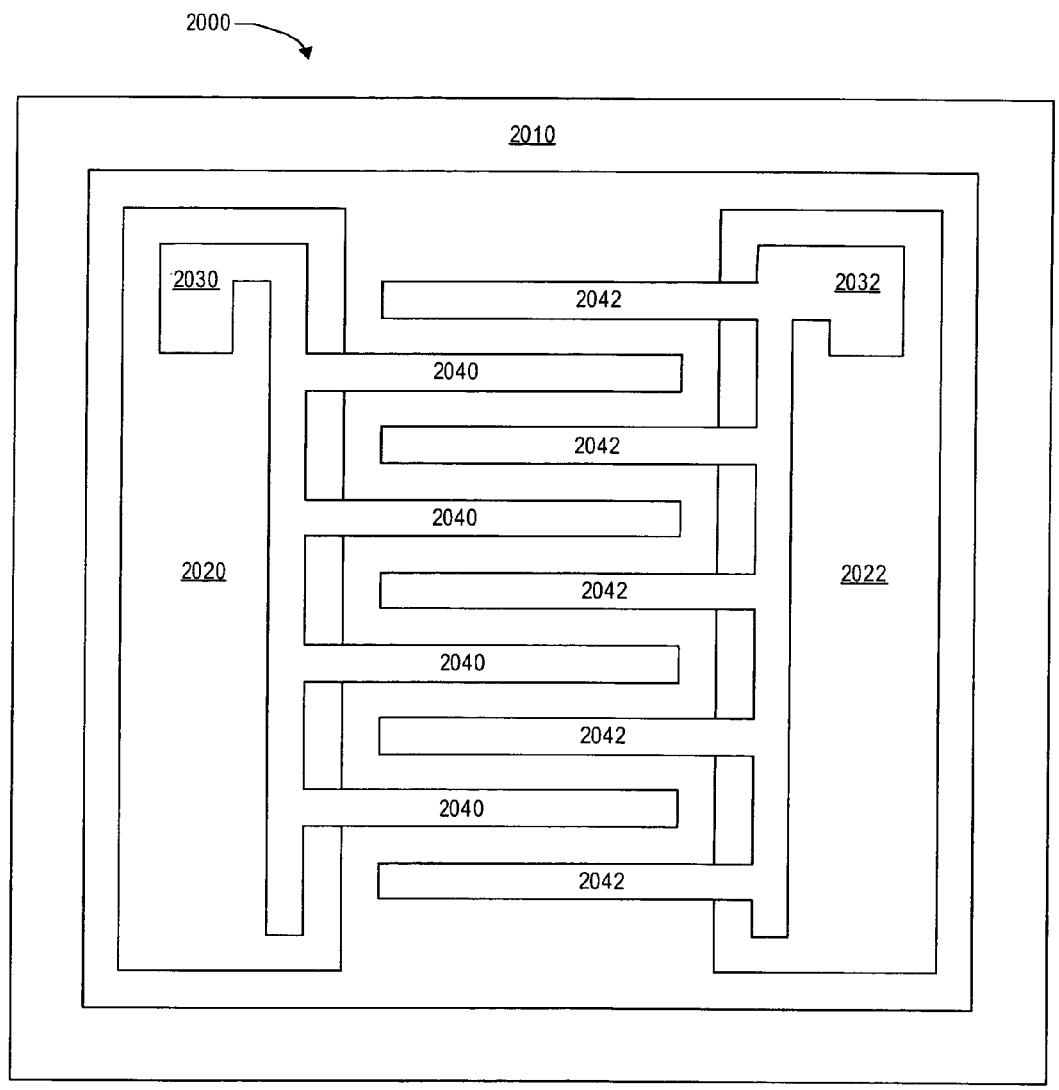
FIG. 20 is a top view of a bare die after deep trenches have been etched according to an exemplary embodiment of the invention.

In addition, although particular layouts and manufacturing techniques have been described herein, embodiments may be associated with other layouts and/or manufacturing techniques. For example, FIG. 20 is a top view of a die 2000 according to an exemplary embodiment of the invention. In particular, trenches have been etched into the die 2000 to create a chamber 2030 that opens into the cavities of a number of fingers 2040 associated with a first comb 2020. Similarly, another chamber 2032 opens into cavities of fingers 2042 associated with a second comb 2022. A wall 2010 surrounding the two combs 2020, 2022 may be provided so that a cap can be bonded to the die 2000. Note that all of the etching illustrated in FIG. 20 might be performed during a single process step.

Figure 21:
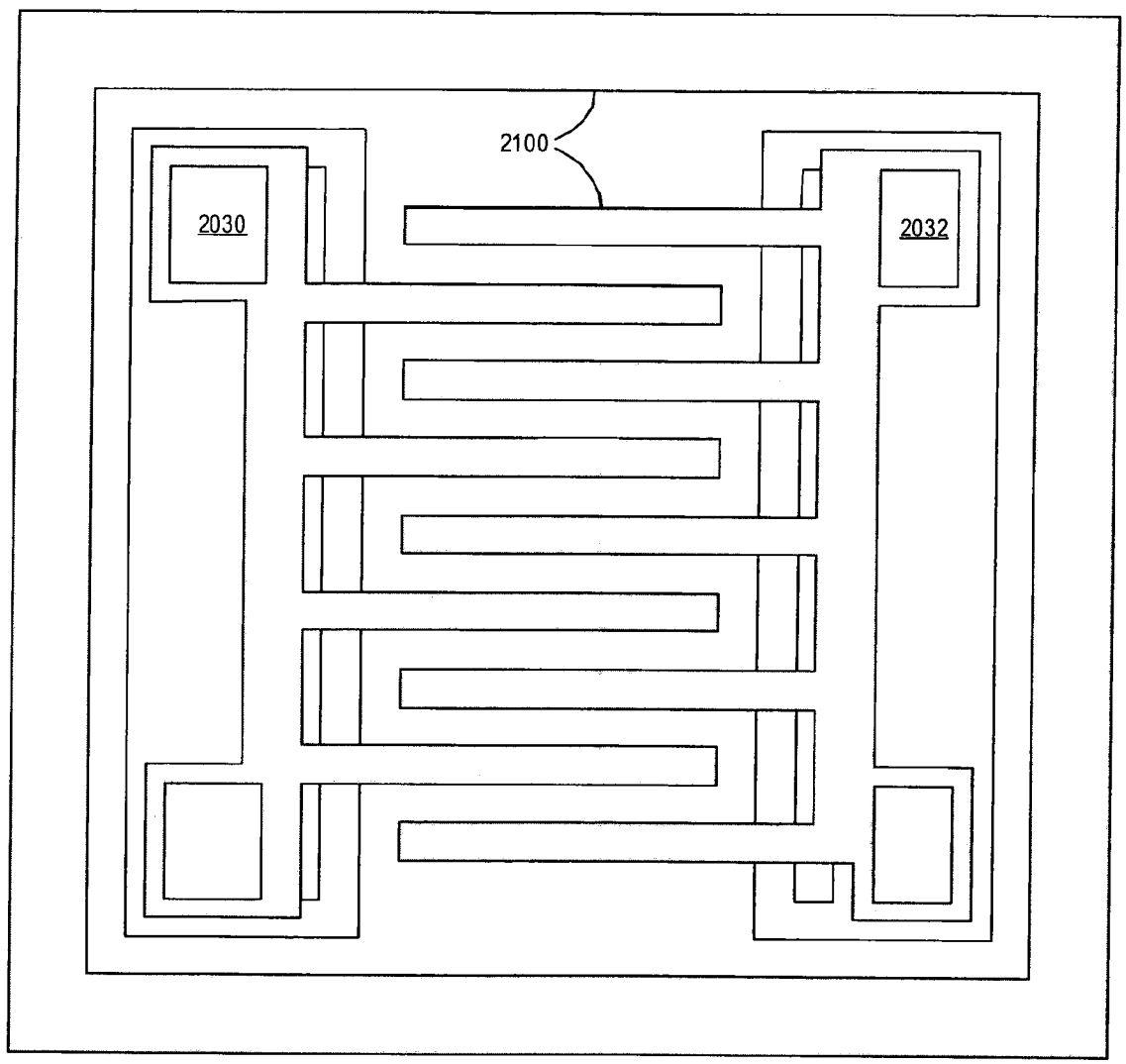
FIG. 21 is a top view of the die of FIG. 20 after an oxide cap has been placed on the die and portions of the oxide cap have been etched away according to an exemplary embodiment of the invention.

FIG. 21 is a top view of the die of FIG. 20 after an oxide cap has been placed on the die and portions of the oxide cap have been etched away according to an exemplary embodiment of the invention. The remaining portion of the layer of oxide 2100 is illustrated by cross-hatching. The oxide layer 2100 may include windows through which pressure can reach the chambers 2030, 2032 and, eventually, the otherwise sealed cavities of the fingers.

Figure 22:
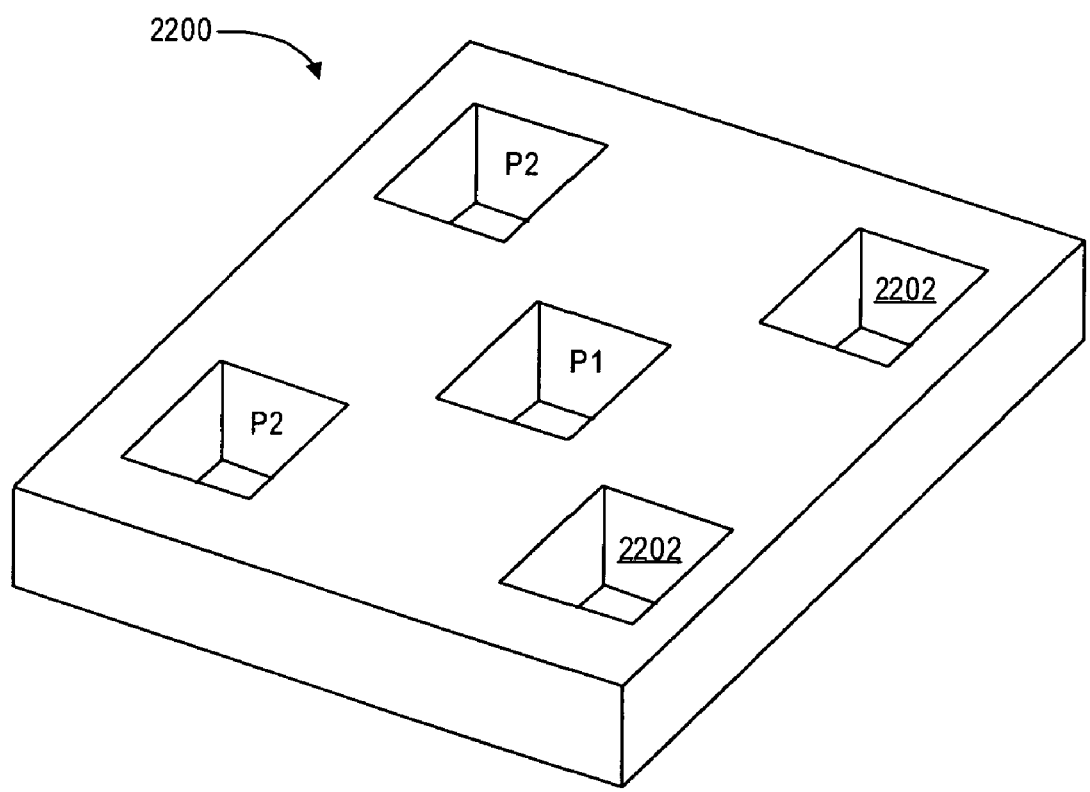
FIG. 22 is a perspective view of a cap wafer that might be used in connection with the die of FIG. 21 according to an exemplary embodiment of the invention.

FIG. 22 is a perspective view of a cap wafer 2200 that might be used in connection with the die of FIG. 21 according to an exemplary embodiment of the invention. The cap wafer 2200 includes five via through which internal portions of the sensor can be reached. In particular, one via is provided for a first pressure P1 and two vias are provided for a second pressure P2. Moreover, two electrical vias 2202 may associated with opposite sides of a capacitor.

Figure 23:
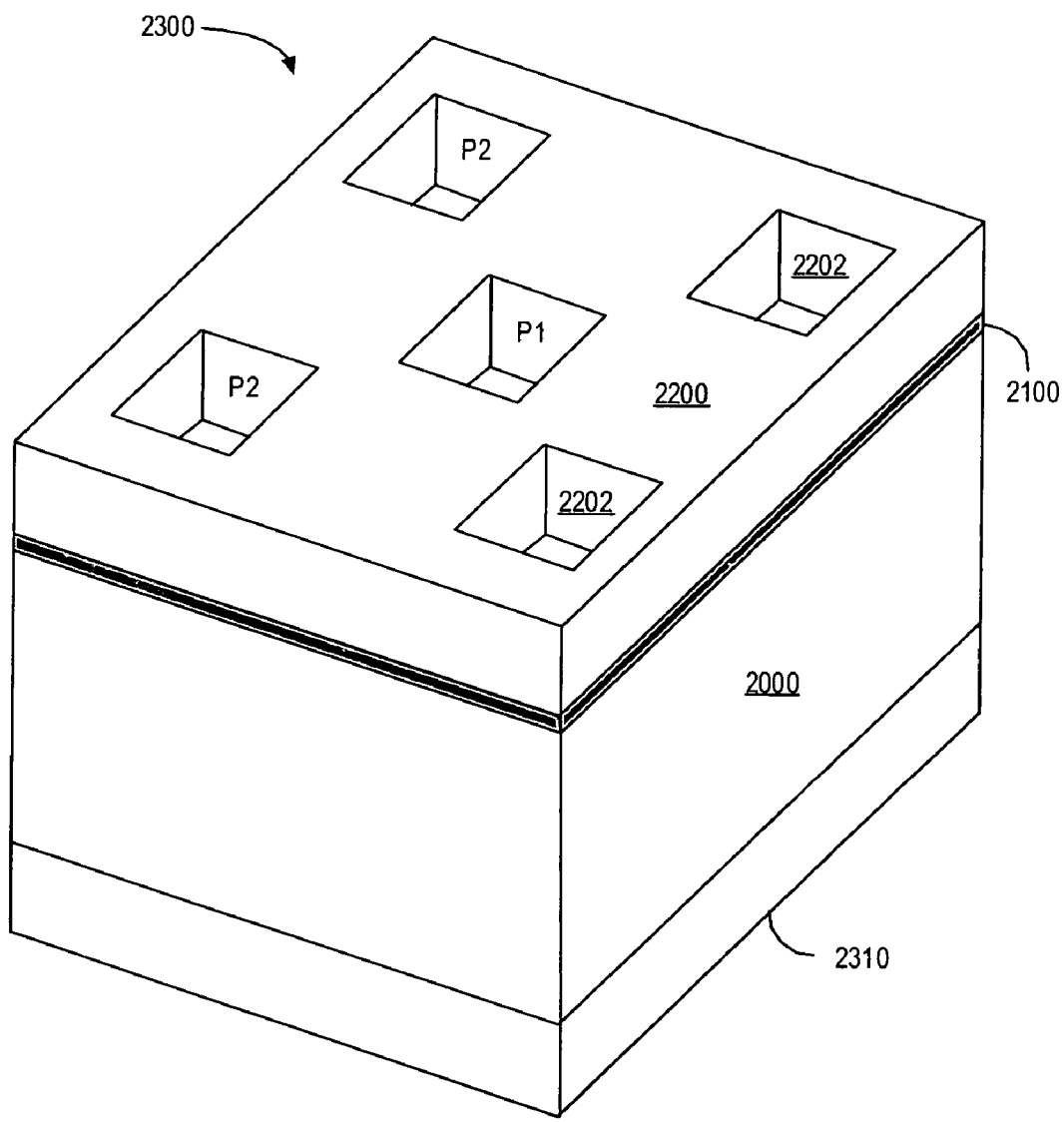
FIG. 23 is a perspective view of a pressure sensor according to an exemplary embodiment of the invention.

FIG. 23 is a perspective view of a pressure sensor package 2300 according to an exemplary embodiment of the invention. In particular, the cap wafer 2200 has been bonded onto the oxide layer 2100. The cap wafer 2200 might be oriented, for example, such that the via associated with pressure P2 are aligned with the chambers 2030, 2032. A bottom cap 2310 might also be provided for the package 2300. Pressure ports and electrical ports may be individually interchangeable between front and back side.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A method, comprising:
   on a wafer that includes a first non-conducting layer bonded onto a conducting layer, etching substantially parallel trenches through the layers to form a plurality of conducting plates substantially normal to a plane defined by the wafer, wherein at least one conducting plate is to be deformable in response to pressure; and
   bonding a second non-conducting layer onto the first non-conducting layer.

2. The method of claim 1, wherein pairs of conducting plates form fingers.

3. The method of claim 2, wherein a first set of fingers is formed on a first comb and a second set of fingers is formed on a second comb, the fingers of the first and second combs being interleaved.

4. The method of claim 3, further comprising:
   etching away a portion of the second non-conducting layer and the first non-conducting layer to expose a portion of the conducting layer.

5. The method of claim 4, further comprising:
   creating a vacuum within a finger.

6. The method of claim 4, further comprising:
   bonding a cap wafer onto the second non-conducting layer.

7. The method of claim 6, wherein the cap wafer includes at least one of: (i) a ground via, (ii) a voltage via, (iii) a first pressure via, and (iv) a second pressure via.

8. The method of claim 1, wherein at least one pressure input cavity is formed while etching the trenches.

* * * * *